United States Patent
Moine et al.

(10) Patent No.: US 10,087,838 B2
(45) Date of Patent: Oct. 2, 2018

(54) DEVICE AND METHOD FOR TEMPORARILY INCREASING POWER

(71) Applicant: SAFRAN HELICOPTER ENGINES, Bordes (FR)

(72) Inventors: Bertrand Moine, Gan (FR); Sophie Humbert, Pau (FR); Patrice Laborde, Billere (FR); Laurent Minel, Pau (FR); Remy Princivalle, Montpellier (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 581 days.

(21) Appl. No.: 14/654,030

(22) PCT Filed: Dec. 18, 2013

(86) PCT No.: PCT/FR2013/053152
§ 371 (c)(1),
(2) Date: Jun. 19, 2015

(87) PCT Pub. No.: WO2014/096694
PCT Pub. Date: Jun. 26, 2014

(65) Prior Publication Data
US 2015/0315965 A1    Nov. 5, 2015

(30) Foreign Application Priority Data
Dec. 20, 2012  (FR) ..................... 12 62433

(51) Int. Cl.
*F02C 3/30* (2006.01)
*B64C 27/14* (2006.01)
*B64D 33/02* (2006.01)

(52) U.S. Cl.
CPC .............. *F02C 3/305* (2013.01); *B64C 27/14* (2013.01); *B64D 2033/024* (2013.01); *F05D 2270/093* (2013.01)

(58) Field of Classification Search
CPC .. F02C 3/30; F02C 3/305; F02C 7/141; F23D 11/10; B64C 27/00; B64C 27/14;
(Continued)

(56) References Cited

U.S. PATENT DOCUMENTS

| 3,234,740 A | 2/1966 | Moore, Jr. |
| 3,434,281 A | 3/1969 | Donaldson |
| 3,518,023 A * | 6/1970 | Britten ................... F02C 3/305 |
| | | 416/30 |

FOREIGN PATENT DOCUMENTS

| CN | 1219217 A | 6/1999 |
| GB | 2079707 A | 1/1982 |

(Continued)

OTHER PUBLICATIONS

International Search Report dated Feb. 7, 2014 in PCT/FR2013/053152 filed Dec. 18, 2013.
(Continued)

*Primary Examiner* — Thai Ba Trieu
*Assistant Examiner* — Loren Edwards
(74) *Attorney, Agent, or Firm* — Oblon, McClelland, Maier & Neustadt, L.L.P.

(57) ABSTRACT

A device and a method of temporarily increasing power of at least a first turbine engine is disclosed. The device includes a coolant liquid tank and a first injection circuit connected to the tank and leading to at least one injection nozzle suitable for being installed upstream from at least one compressor stage of the first turbine engine. This first injection circuit includes at least a first flow valve configured to open when a pressure exceeds a predetermined threshold compared with a downstream pressure from at least one compressor stage of a second turbine engine so as to enable the coolant liquid to flow towards the injection nozzle of the first injection circuit.

7 Claims, 4 Drawing Sheets

(58) Field of Classification Search
CPC ......... B64D 2033/024; F05D 2270/093; F05D 2270/05; F05D 2270/051; F05D 2270/052
USPC ... 60/775, 39.15, 39.091, 793, 39.24, 39.25, 60/39.26, 39.27, 39.281, 39.282, 794, 60/795, 39.3
See application file for complete search history.

(56) References Cited

FOREIGN PATENT DOCUMENTS

| | | |
|---|---|---|
| JP | 11-72029 A | 3/1999 |
| JP | 2002-221045 A | 8/2002 |

OTHER PUBLICATIONS

Search Report dated Apr. 20, 2016 in Chinese Patent Application No. 2013800673630.0 (English translation only).
Office Action dated Aug. 8, 2017 in Japanese Patent Application No. 2015-548717 (submitting English translation only).

* cited by examiner

DEVICE AND METHOD FOR TEMPORARILY INCREASING POWER

BACKGROUND OF THE INVENTION

The present invention relates to the field of turbine engines, and in particular to a device for temporarily increasing power of at least a first turbine engine.

In the present context, the term "turbine engine" is used to mean any machine enabling thermal energy from a working fluid to be converted into mechanical energy by said working fluid expanding in a turbine. More particularly, the working fluid may be a combustion gas resulting from chemical reaction between a fuel and air in a combustion chamber. Thus, turbine engines, as understood in the present context, include among other things, straight-flow or bypass turbojets, turboprops, turboshaft engines, and gas turbines. In the description below, the terms "upstream" and "downstream" are defined relative to the normal flow direction of the working fluid through the turbine engine.

In certain circumstances, it can be desirable to increase temporarily the power of a turbine engine. For example, in a power plant comprising a plurality of turbine engines, the failure of one of them may make it necessary, temporarily during an emergency period, to increase the power of the others in order to compensate for the loss of power from the turbine engine that has failed.

One of the solutions known to the person skilled in the art for obtaining such a temporary increase in power is to inject a coolant liquid, which may be constituted, by way of example, by water or a mixture of water and an antifreeze, e.g. methanol, ethanol, or glycol, this liquid being injected into the air admission upstream from the combustion chamber. This injection serves firstly to cool the air upstream from the combustion chamber, thereby increasing its density and thus the mass flow rate of oxygen admitted into the combustion chamber. Secondly, the vaporization of this coolant liquid in the combustion chamber serves to increase very significantly the pressure and/or the volume flow rate downstream from the combustion chamber, and thus serves to increase very significantly the mechanical work recovered in the turbine.

Nevertheless, on-board vehicles, and in particular aircraft, the use of such a coolant liquid is limited by the weight of the coolant liquid that can be carried by the vehicle. In British patent application GB 2 046 681 A, proposals are made to feed the aircraft with coolant liquid from a stationary tank.
Nevertheless, that solution is clearly practical only if the aircraft is also stationary or almost stationary.

The desire to have additional power available for a period that is as long as possible, is thus in direct conflict with the desire to minimize the additional weight constituted by the coolant liquid.

Furthermore, when the purpose of this temporary increase in power is to compensate for the failure of another turbine engine, it is also desirable for this increase to be triggered automatically and as quickly as possible.

OBJECT AND SUMMARY OF THE INVENTION

The present invention seeks to remedy those drawbacks. More specifically, the present invention seeks to propose a device for temporarily increasing the power of at least a first turbine engine, the device comprising a tank of coolant liquid, and a first injection circuit connected to said tank and leading to at least one injection nozzle suitable for being installed upstream from said at least one compressor stage of the first turbine engine, and that enables the injection of coolant liquid to be triggered automatically in the event of a second turbine engine failing.

In at least one embodiment of such a device, these objects may be achieved by the fact that the first injection circuit includes at least a first flow valve configured to open when pressure upstream from said first flow valve exceeds downstream pressure from at least one compressor stage of a second turbine engine by an amount greater than a predetermined threshold, to allow the coolant liquid to flow towards said injection nozzle of the first injection circuit, and in that the device for temporarily increasing power also includes at least one pressurization circuit suitable for being connected to at least one compressor stage of the first turbine engine for pressurizing said tank and including a check valve to avoid depressurizing the tank.

By means of these provisions, once the device has been activated, a failure of the second turbine engine leading to a drop in the pressure supplied by its compressor causes the pressure upstream from the flow valve to become greater than this pressure supplied by the compressor by an amount that exceeds the predetermined threshold for opening the flow valve, thereby triggering the opening of the flow valve and the flow of the coolant liquid towards the injection nozzle. Since the pressure upstream from the flow valve is determined by the tank being pressurized by the compressor of the second turbine engine, whether or not this first flow valve is to be opened depends on the difference between the pressure supplied by at least the first turbine engine and the pressure supplied by the second turbine engine. If both turbine engines are operating at the same speed, which would typically be the normal situation, these two pressures should be substantially equal and the excess pressure will not exceed the predetermined threshold, so the first flow valve will remain closed. In contrast, if the speed of the second turbine engine decreases relative to the speed of the first turbine engine as a result of a failure, the pressure supplied by the first turbine engine compared with the pressure supplied by the second turbine engine can force the first flow valve to open and allow the coolant liquid to flow towards the injection nozzle.

With the flow valve in the open position, the pressurization of the tank serves to propel the flow of the coolant liquid through the first injection circuit. Thus, the flow rate of the coolant liquid as injected via the first injection circuit is regulated in passive manner by the pressure difference between the tank and atmospheric pressure, thereby naturally providing compensation, at least in part, for the reduction in the performance of the first turbine engine at high altitude, by injecting a greater flow rate of coolant liquid therein.

In particular, in order to continue pressurizing the tank equally well in the event of the second turbine engine failing and in the event of the first turbine engine failing, the device for temporarily increasing power may also include a second pressurization circuit for connecting to the compressor stage of the second turbine engine. In addition, the tank may include at least one depressurization solenoid valve and/or at least one safety valve serving respectively to reestablish atmospheric pressure in the tank when the turbine engines are stopped, and to avoid the pressure in the tank becoming excessive when one or the other of the turbine engines is overspeeding, with this being for the purpose of limiting mechanical stresses that are due to this pressurization.

Not only is it desirable to be capable of compensating for a failure of the second turbine engine by temporarily increasing the power supplied by the first turbine engine, it is also desirable to be capable of compensating for a failure of the first turbine engine by temporarily increasing the power supplied by the second turbine engine, and to do so in the same manner. For this purpose, the device for temporarily increasing power may also include a second injection circuit connected to said tank, leading to at least one injection nozzle, and including at least one flow valve configured to open when pressure exceeds a predetermined threshold relative to a downstream pressure from at least one compressor stage of the first turbine engine, so as to enable the coolant liquid to flow towards said injection nozzle of the second injection circuit. This higher pressure may be pressure downstream from the at least one compressor stage of the second turbine engine and/or upstream from the flow valve of the second injection circuit compared with the pressure downstream from at least one compressor stage of the first turbine engine.

Even though the failure of one turbine engine in a plurality of more than two turbine engines has a smaller impact, the present invention is also applicable to such a plurality. Thus, in order to trigger such a device for temporarily increasing power of at least a first turbine engine in the event of a failure of the second turbine engine or of a third turbine engine, the first injection circuit may also include at least a second flow valve connected in parallel with the first flow valve of said first injection circuit and configured to open when a pressure exceeds a predetermined threshold relative to a downstream pressure from at least one compressor stage of a third turbine engine, so as to allow the coolant liquid to flow towards said injection nozzle of the first injection circuit. The parallel configuration of two flow valves thus makes it possible to trigger the flow of the coolant liquid towards at least one injection nozzle both in the event of failure of the second turbine engine and in the event of failure of the third turbine engine. In addition, the device may have one injection circuit for each turbine engine, with each parallel-connected flow valve corresponding to a respective one of the other turbine engines.

Each injection circuit may also include an additional valve upstream from said at least one flow valve. This additional valve serves to activate or deactivate the injection circuit, in particular to avoid injecting the coolant liquid in situations which it is deemed not to be necessary.

The present description also provides a power plant having at least a first turbine engine, a second turbine engine, and such a device for temporarily increasing the power of at least the first turbine engine, wherein said injection nozzle of the first injection circuit is installed upstream from said compressor stage of the first turbine engine, and the first flow valve of the first injection circuit is connected to said compressor stage of the second turbine engine in order to control said first flow valve.

In addition, the present description also relates to an aircraft, such as a rotary wing aircraft, for example, that includes such a power plant.

The present description also relates to a method of temporarily increasing power of a first turbine engine, wherein a first flow valve of a first injection circuit connected to a tank of injection liquid and leading to at least one injection nozzle upstream from the at least one compressor stage of the first turbine engine opens when pressure upstream from said first flow valve is greater than downstream pressure from at least one compressor stage of the second turbine engine by an amount that exceeds a predetermined threshold so as to enable coolant liquid to flow through the first injection circuit and be injected by said injection nozzle upstream from at least one compressor stage of the first turbine engine, said tank being pressurized by at least one pressurization circuit connected to at least one compressor stage of the first turbine engine and including a check valve in order to avoid depressurizing the tank.

BRIEF DESCRIPTION OF THE DRAWINGS

The invention can be well understood and its advantages appear better on reading the following detailed description of an embodiment given by way of non-limiting example. The description refers to the accompanying drawings, in which.

DETAILED DESCRIPTION OF THE INVENTION

Figure 1:
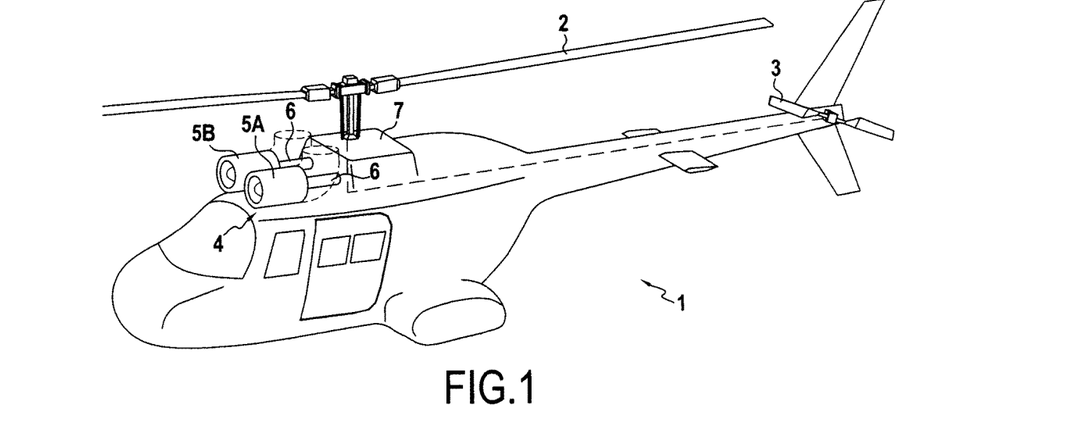
FIG. 1 is a diagram of an aircraft having a power plant with a first embodiment of a device for temporarily increasing power.

The first figure shows a rotary wing aircraft 1, more specifically a helicopter having a main rotor 2 and an anti-torque tail rotor 3 that are coupled to be driven by a power plant 4. The power plant 4 as shown has two turbine engines, more specifically a first turboshaft engine 5A and a second turboshaft engine 5B with respective outlet shafts 6 that are both connected to a main gearbox 7 for driving the main rotor 2 and the tail rotor 3.

Figure 2:
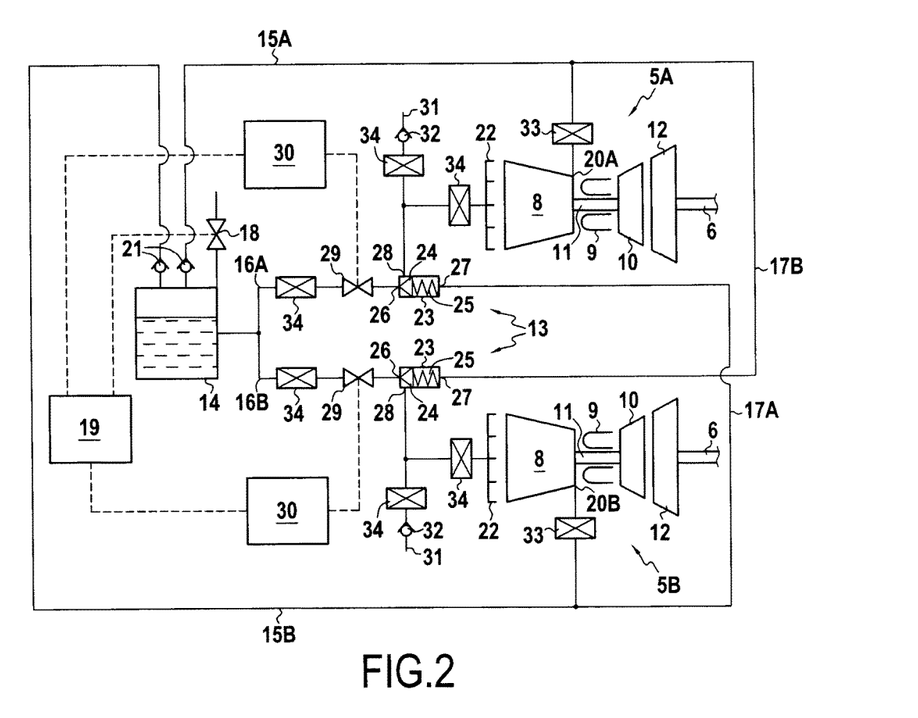
FIG. 2 is a diagram of the power plant of the FIG. 1 aircraft.

The power plant 4 is shown in greater detail in FIG. 2. Each turboshaft engine 5A, 5B comprises a compressor 8, a combustion chamber 9, a first turbine 10 connected by a drive shaft 11 to the compressor 8, and a second turbine 12, or "free" turbine, that is coupled to an outlet shaft 6. In order to compensate at least temporarily for a drop in power due to a failure of one of the turboshaft engines 5A or 5B, the power plant 4 has a device 13 for temporarily increasing the power from the other turboshaft engine 5A, 5B. This device 13 comprises a tank 14 of coolant liquid, a first pressurizing circuit 15A for pressurizing the tank 14, a second pressurizing circuit 15B for pressurizing the tank 14, a first coolant liquid injection circuit 16A, and a second coolant liquid injection circuit 16B. The coolant liquid contained in the tank 14 may be constituted by way of example by water on its own or by water mixed with an antifreeze, such as methanol, ethanol, and/or glycol. The tank 14 has a depressurization solenoid valve 18 connected to a central control unit 19 of the aircraft 1. Using this solenoid valve 18, the central control unit 19 can cause the tank to be depressurized, e.g. after a flight has ended.

The first pressurization circuit 15A connects the tank 14 to a pressurized air takeoff point 20A located downstream from at least one stage of the compressor 8 of the first turboshaft engine 5A. It includes a check valve 21 oriented so as to enable pressurized air to flow from the compressor 8 towards the tank 14, but to prevent the tank 14 being depressurized in the opposite direction. The second pressurization circuit 15B connects the tank 14 to a pressurized air takeoff point 20B downstream from at least one stage of the compressor 8 of the second turboshaft engine 5B. It includes a check valve 21 oriented so as to enable pressurized air to flow from the compressor 8 towards the tank 14, but to prevent the tank 14 being depressurized in the opposite direction. By means of this redundancy of pressurization circuits 15A, 15B, it is possible to ensure that the tank 14 continues to be pressurized even in the event of a failure of the turboshaft engine to which the other circuit is connected.

Each of the first and second injection circuits 16A, 16B is connected to the tank 14 and leads to a plurality of injection nozzles 22 installed upstream from the compressors 8 of the first and second turboshaft engines 5A and 5B. Each of these injection circuits 16A, 16B includes a respective flow valve 23, which is a fluid-controlled on/off valve for passing or preventing a flow of the coolant liquid from the tank 14 via the injection circuit 16A, 16B to the injection nozzles 22 upstream from the compressor 8 of the corresponding turboshaft engine 5A, 5B. This fluid-controlled flow valve 23 has a piston 24 slidably mounted in a chamber 25 presenting a feed inlet 26, a control inlet 27, and an outlet 28. The feed inlet 26 and the outlet 28 are situated on the same side of the piston 24, which is biased against the feed inlet 26, while the control inlet 27 is situated on the opposite side of the piston 24. Thus, the flow valve 23 is opened by the pressure of the feed inlet 26 being higher than the pressure of the control inlet 27. When this pressure difference exceeds a threshold predetermined by the axial bias of the piston 24, the flow valve 23 opens to allow the coolant liquid to flow through the flow valve 23.

In each of the two injection circuits 16A, 16B, the feed inlet 26 of the flow valve 23 is connected to the tank 14, while the outlet 28 is connected to the nozzles 22. In contrast, in the first injection circuit 16A, the control inlet 27 of the flow valve 23 is connected to a duct 17A connected to the pressurized air takeoff point 20B of the second turboshaft engine 5B, while in the second injection circuit 16B, the control inlet 27 of the flow valve 23 is connected to a duct 17B connected to the pressurized air takeoff point 20A of the first turboshaft engine 5A.

Thus, in the first injection circuit 16A, the flow valve 23 is controlled by the pressure of the coolant liquid delivered by the tank 14 being higher than the pressure of the compressed air supplied by the compressor 8 of the second turboshaft engine 5B, while in the second injection circuit 16B, the flow valve 23 is opened by the pressure of the same of the coolant liquid being higher than the pressure of the compressed air supplied by the compressor 8 of the first turboshaft engine 5A. So long as the substantially identical first and second turboshaft engines 5A and 5B are operating at the same speed, these pressure differences are zero and the flow valves 23 in both injection circuits 16A and 16B remain closed. Nevertheless, in the event of the second turboshaft engine 5B failing while the first turboshaft engine 5A continues to operate at a normal speed, the pressure in the tank 14A, which is still pressurized by the compressed air supplied by the compressor 8 of the first turboshaft engine 5A is higher than the pressure supplied by the compressor 8 of the second turboshaft engine 5B via the duct 17A, and it increases so as eventually to overcome the bias closing the piston 24 of the flow valve 23 of the first injection circuit 16A, thereby opening a passage for the coolant liquid so as to enable a flow of coolant liquid to be injected into the upstream end of the compressor 8 of the first turboshaft engine 5A. The coolant liquid as injected in this way into the air stream in the first turboshaft engine 5A can thus temporarily increase its power in order to compensate for the failure of the second turboshaft engine 5B. Furthermore, in the event of the first turboshaft engine 5A failing while the second turboshaft engine 5B continues to operate at a normal speed, the pressure in the tank 14, which is still pressurized by the compressed air supplied by the compressor 8 of the second turboshaft engine 5B is higher than the pressure supplied by the compressor 8 of the first turboshaft engine 5A via the duct 17B, and it continues to increase so as eventually to overcome the bias closing the piston 24 of the flow valve 23 of the second injection circuit 16B, thereby providing a passage for the coolant liquid so as to enable a flow of coolant liquid to be injected into the upstream end of the compressor 8 of the second turboshaft engine 5B. The coolant liquid injected in this way into the air stream in the second turboshaft engine 5B can thus temporarily increase its power so as to compensate for the failure of the first turboshaft engine 5A. In both situations, the flow rate at which the coolant liquid is injected is regulated in passive manner by the amount the pressure in the tank 14 is higher than atmospheric pressure. Thus, the device 13 for temporarily increasing power can serve naturally to compensate, at least in part, for the reduced performance of the turboshaft engines 5A, 5B at high altitude by injecting greater flow rates of coolant liquid.

Directly upstream from its flow valve 23, each injection circuit 16A, 16B also includes a solenoid valve 29 connected to an individual control unit 30 of the turboshaft engine 5A, 5B that is downstream from the injection circuit 16A, 16B in order to activate or deactivate each of the circuits 16A, 16B. Thus, this individual control unit 30, which is also connected to the central control unit 19, can activate the injection circuit 16A, 16B by causing the solenoid valve 29 to open as a function of operating parameters of each of the turboshaft engines 5A, 5B and/or as a function of a command from a user, such as a pilot for example, and can deactivate it once more by causing the solenoid valve 29 to close. Each injection circuit 16A, 16B also includes a liquid inlet 31 with a check valve 32 enabling the nozzles 26 also to be used for cleaning the compressors 8. A filter 33 in each pressurization circuit 15A, 15B serves to avoid the coolant liquid in the tank 14 being contaminated by contaminants coming from the turboshaft engines 5A, 5B. Strainer filters 34 in the injection circuits 16A, 16B also make it possible to avoid other contaminants being injected together with the coolant liquid into the air streams of the turboshaft engines 5A, 5B.

Figure 3:
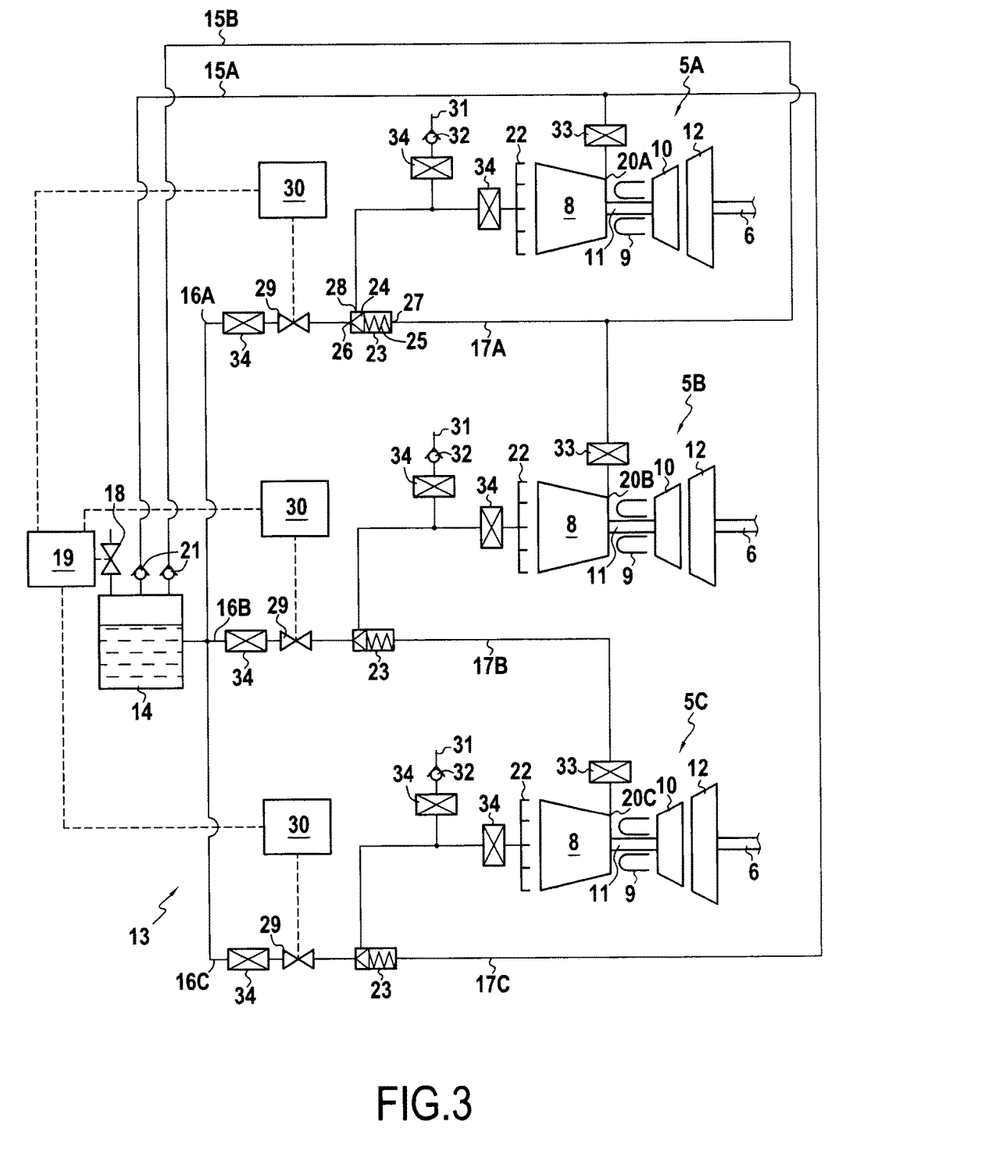
FIG. 3 is a diagram of a power plant with a second embodiment of a device for temporarily increasing power.

Although in this first embodiment the power plant 4 has only two turboshaft engines 5A and 5B, the same principles can also be applied to power plants having more than two turbine engines. Thus, FIG. 3 shows a power plant 4 having three turboshaft engines 5A, 5B, and 5C together with a device 13 for temporarily increasing their power in a second embodiment.

In this second embodiment, the device 14 is configured in such a manner that in the event of one of the turboshaft engines 5A, 5B, or 5C failing, the coolant liquid is injected into the air stream upstream from one of the other two turboshaft engines in order to compensate temporarily for the loss of power from the power plant 4 as caused by such a failure.

For this purpose, and as in the first embodiment, the device 13 has a first circuit 16A for injecting the coolant liquid into the upstream end of the air stream through the first turboshaft engine 5A, and a second circuit 16B for injecting the coolant liquid into the upstream end of the stream of air through the second turboshaft engine 5B, together with a third circuit 16C for injecting the coolant liquid into the upstream end of the stream of air through the third turboshaft engine 5C.

Each of these first, second, and third injection circuits 16A, 16B, and 16C is connected to the tank 14 and leads to a plurality of injection nozzles 22 installed upstream from the compressor 8 of the respective one of the first, second, and third turboshaft engines 5A, 5B, and 5C. Each of these injection circuits 16A, 16B, and 16C has a respective flow valve 23 for passing or preventing the passage of a flow of coolant liquid from the tank 14 to the injection nozzles 22 upstream from the compressor 8 of the corresponding turboshaft engine 5A, 5B, 5C.

Each of the flow valves 23 in the injection circuit 16A, 16B, 16C is a fluid-controlled on/off valve having the same structure and operating in the same manner as the flow valves of the first embodiment. In this second embodiment, the flow valve 23 of the circuit 16A, 16B, or 16C for injecting coolant liquid into the upstream end of each turboshaft engine 5A, 5B, or 5C is controlled by the pressure of the coolant liquid being higher than the pressure supplied by the compressor 8 of one of the other two turboshaft engines. Thus, in the first injection circuit 16A, the duct 17A connects the control inlet 27 of the first flow valve 23 to the pressurized air takeoff point 20B downstream from at least one stage of the compressor 8 of the second turboshaft engine 5B. In the second injection circuit 16B, the duct 17B connects the control inlet 27 of the first flow valve 23 to the pressurized air takeoff point 20C downstream from at least one stage of the compressor 8 of the third turboshaft engine 5C. Finally, in the third injection circuit 16C, the duct 17C connects the control inlet 27 of the first flow valve 23 to the pressurized air takeoff point 20A downstream from at least one stage of the compressor 8 of the first turboshaft engine 5A.

Thus, in the event of a failure of any one of the three turboshaft engines 5A, 5B, 5C, the flow valve 23 of the circuit for injecting coolant liquid into the upstream end of one of the other two turboshaft engines will open in order to inject coolant liquid into the air stream through that other turboshaft engine, with the flow rate of the injection being regulated naturally by the extent to which the pressure in the tank 14 is higher than atmosphere pressure. The other components of this device 13 for temporarily increasing power are substantially identical to those of the first embodiment and they are consequently given the same reference numbers. In particular, in this second embodiment, the same two pressurization circuits 15A, 15B of the first embodiment suffice for providing sufficient redundancy in order to compensate for the failure of a single one of the turboshaft engines 5A, 5B, or 5C, even though it is naturally equally possible to envisage providing a third pressurization circuit connected to the third turboshaft engine 5C.

In certain circumstances, in a power plant having more than two turbine engines, in the event of one of the turbine engines failing, it may be desirable to increase the power temporarily of more than only one of the other turbine engines in order to compensate for the loss of power from the failed turbine engine. A third embodiment shown in FIG. 4 has a power plant 4 with three turboshaft engines 5A, 5B, and 5C having a device 13 for temporarily increasing their power that makes it possible temporarily to increase the power of two of the turboshaft engines in the event of a failure of the third.

Figure 4:
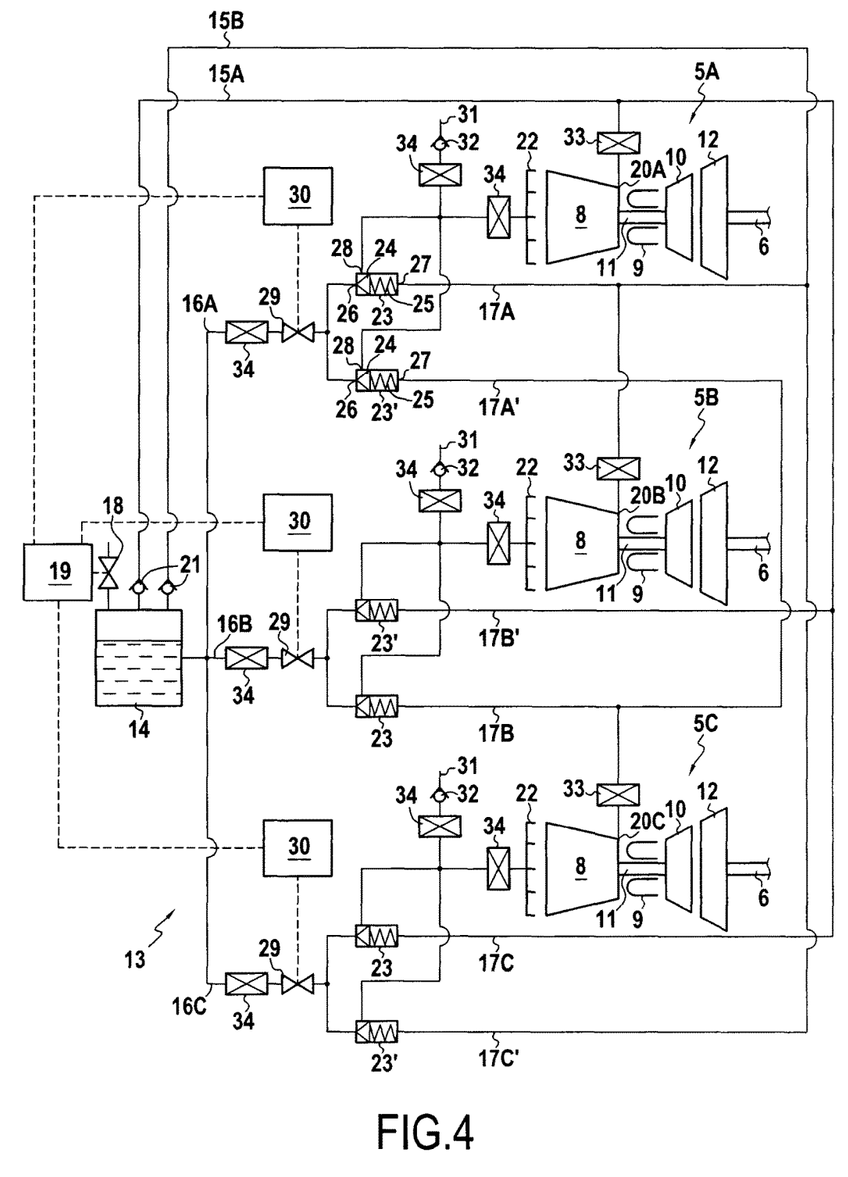
FIG. 4 is a diagram of a power plant with a third embodiment of a device for temporarily increasing power.

In this third embodiment, the device 14 is configured in such a manner that in the event of a failure of one of the turboshaft engines 5A, 5B, or 5C, coolant liquid is injected into the upstream ends of the air streams through the other two turboshaft engines so as to compensate temporarily for the loss of power in the power plant 4 that results from such a failure.

For this purpose, as in the second embodiment, the device 13 has a first circuit 16A for injecting the coolant liquid into the upstream end of the air stream through the first turboshaft engine 5A, a second circuit 16B for injecting the coolant liquid into the upstream end of the air stream through the second turboshaft engine 5B, and a third circuit 16C for injecting the coolant liquid into the upstream end of the air stream through the third turboshaft engine 5C.

As in the second embodiment, each of the first, second, and third injection circuits 16A, 16B, and 16C is connected to the tank 14 and leads to a plurality of injection nozzles 22 installed upstream from the compressor 8 of a respective one of the first, second, and third turboshaft engines 5A, 5B, and 5C. Nevertheless, each of these injection circuits 16A, 16B, and 16C has first and second flow valves 23, 23' that are connected in parallel to pass or to block a flow of coolant liquid from the tank 14 to the injection nozzles 22 upstream from the compressor 8 of the corresponding turboshaft engine 5A, 5B, or 5C.

Each of the first and second flow valves 23 and 23' of each injection circuit 16A, 16B, and 16C is a fluid-controlled flow valve having the same structure and the same operation as the flow valves of the first embodiment. In this third embodiment, each of the flow valves 23 and 23' of each of the circuits 16A, 16B, and 16C for injecting coolant liquid into the upstream end of a turboshaft engine 5A, 5B, 5C is controlled by the pressure of the coolant liquid being higher than the pressure supplied by the compressor 8 of one of the other two turboshaft engines. Thus, in the first injection circuit 16A, the duct 17A connects the control inlet 27 of the first flow valve 23 to the pressurized air takeoff point 20B downstream from at least one stage of the compressor 8 of the second turboshaft engine 5B, while the duct 17A' connects the control inlet 27 of the second flow valve 23' to a pressurized air takeoff point 20C downstream from at least one stage of the compressor 8 of the third turboshaft engine 5C. In the second injection circuit 16B, the duct 17B connects the control inlet 27 of the first flow valve 23 to the pressurized air takeoff point 20C downstream from at least one stage of the compressor 8 of the third turboshaft engine 5C, while the duct 17C' connects the control inlet 27 of the second flow valve 23' to the pressurized air takeoff point 20A downstream from at least one stage of the compressor 8 of the first turboshaft engine 5A. Finally, in the third injection circuit 16C, the duct 17C connects the control inlet 27 of the first flow valve 23 to the pressurized air takeoff point 20A downstream from at least one stage of the compressor 8 of the first turboshaft engine 5A, while the duct 17B' connects the control inlet 27 of the second flow valve 23' to the pressurized air takeoff point 20B downstream from at least one stage of the compressor 8 of the second turboshaft engine 5B.

Thus, in the event of a failure of any one of the three turboshaft engines 5A, 5B, and 5C, the first or second flow valves 23 or 23' in the circuit for injecting coolant liquid into the upstream ends of the other two turboshaft engines will open so as to inject coolant fluid into the air streams of those two other circuits, with the flow rate of that injection being regulated naturally by the extent to which the pressure in the tank 14 is higher than atmospheric pressure. The remainder of the components of this device 13 for temporarily increasing power are substantially identical to those of the second embodiment and consequently they are given the same reference numbers. In particular, in this third embodiment, as in the second embodiment, the two pressurization circuits 15A and 15B suffice to provide redundancy that can compensate for the failure of a single one of the turboshaft engines 5A, 5B, and 5C, even though it is naturally also possible to envisage having a third pressurization circuit connected to the turboshaft engine 5C.

Figure 5:
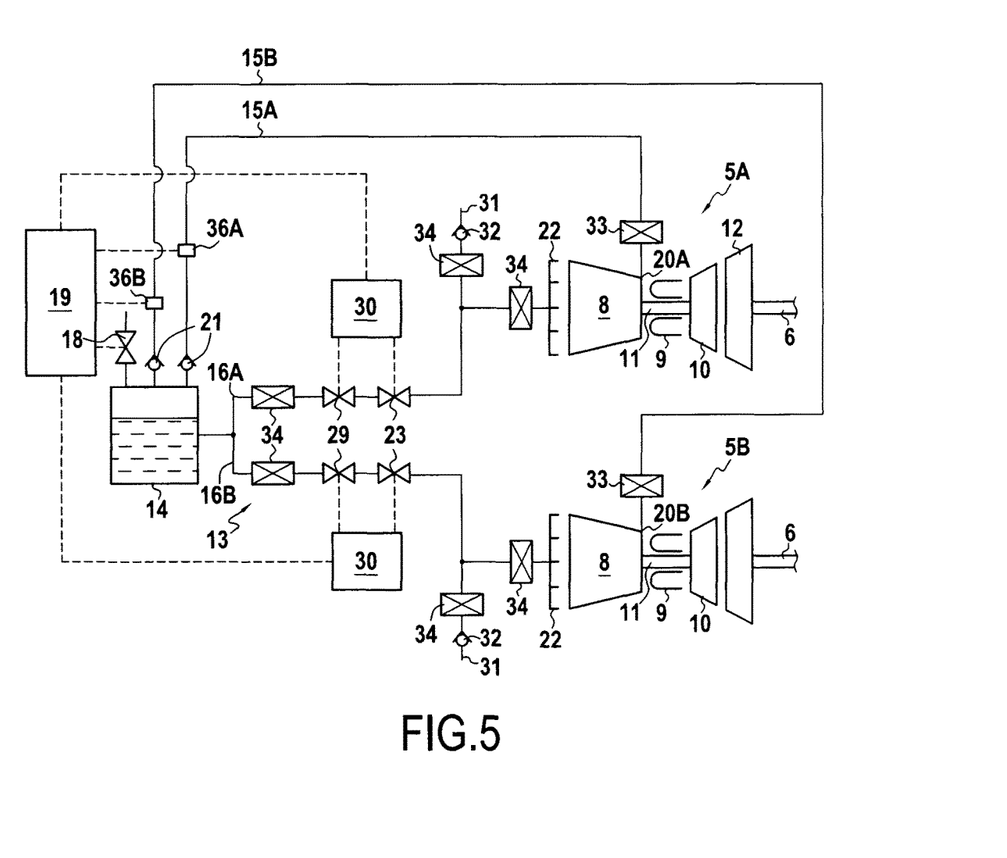
FIG. 5 is a diagram of a fourth embodiment of a device for temporarily increasing power.

Finally, even though the flow valves in the three above-described embodiments are fluid-controlled valves, it is also possible to envisage other control means. Thus, in a fourth embodiment shown in FIG. 5, the two flow valves 23 are electrically-controlled valves connected to the individual control units 30 of the corresponding turboshaft engines 5A and 5B. Pressure sensors 36A and 36B arranged in the pressurization circuit 15A and 15B and connected to the central control unit 19 serve to pick up and compare the air pressures supplied by the compressors 8 of the two turboshaft engines 5A and 5B for the purpose of opening each flow valve 23 as a function of the difference between these two pressures, in a manner analogous to the fluid control used in the first embodiment. The remaining components of this device 13 for temporarily increasing power are substantially identical to those of the first embodiment, and consequently they receive the same reference numbers.

Although the present invention is described with reference to a specific embodiment, it is clear that various modifications and changes may be applied to these embodiments without going beyond the general ambit of the invention as defined by the claims. In addition, individual characteristics of the various embodiments mentioned may be combined in additional embodiments. Consequently, the description and the drawings should be considered to be illustrative rather than restrictive.

The invention claimed is:

1. A device for temporarily increasing the power of at least a first turbine engine, the device comprising:
   a tank of coolant liquid; and
   a first injection circuit connected to said tank and leading to at least one injection nozzle suitable for being installed upstream from at least one compressor stage of the first turbine engine;
   wherein the first injection circuit includes at least a first flow valve configured to open when pressure upstream from said first flow valve exceeds downstream pressure from at least one compressor stage of a second turbine engine by an amount greater than a predetermined threshold, so as to allow the coolant liquid to flow towards said injection nozzle of the first injection circuit, and wherein said device further includes at least one pressurization circuit suitable for being connected to at least one compressor stage of the first turbine engine to pressurize said tank with compressed air from the at least one compressor stage and including a check valve to avoid depressurizing the tank.

2. The device according to claim 1, further including a second injection circuit connected to said tank, leading to at least one injection nozzle, and including at least one flow valve configured to open when pressure exceeds a predetermined threshold relative to a downstream pressure from at least one compressor stage, to enable the coolant liquid to flow towards said injection nozzle of the second injection circuit.

3. The device according to claim 1, wherein at least said first injection circuit further includes at least one second flow valve connected in parallel with the first flow valve of said first injection circuit and configured to open when pressure exceeds a predetermined threshold relative to a downstream pressure from a compressor stage of a third turbine engine so as to enable the coolant liquid to flow towards said injection nozzle of the first injection circuit.

4. The device according to claim 1, wherein each injection circuit further includes an additional valve upstream from the at least one flow valve.

5. A power plant including at least a first turbine engine, a second turbine engine, and a device according to claim 1, wherein said injection nozzle of the first injection circuit is installed upstream from said at least one compressor stage of the first turbine engine, and the first flow valve of the first injection circuit is connected to a compressor of the second turbine engine in order to control said first flow valve.

6. An aircraft including a power plant according to claim 5.

7. A method of temporarily increasing power of a first turbine engine, wherein a first flow valve of a first injection circuit connected to a tank of coolant liquid and leading to at least one injection nozzle upstream from at least one compressor stage of the first turbine engine opens when pressure upstream from said first flow valve is greater than downstream pressure from at least one compressor stage of a second turbine engine by an amount that exceeds a predetermined threshold so as to enable coolant liquid to flow through the first injection circuit and be injected by said injection nozzle upstream from at least one compressor stage of the first turbine engine, said tank being pressurized with compressed air by at least one pressurization circuit connected to at least one compressor stage of the first turbine engine and including a check valve in order to avoid depressurizing the tank.

* * * * *